(12) United States Patent
Desjardins et al.

(10) Patent No.: US 11,208,957 B2
(45) Date of Patent: Dec. 28, 2021

(54) EPICYCLIC GEAR STAGE

(71) Applicant: PRATT & WHITNEY CANADA CORP., Longueuil (CA)

(72) Inventors: Michel Desjardins, St-Hubert (CA); Hervé Turcotte, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 16/861,770

(22) Filed: Apr. 29, 2020

(65) Prior Publication Data

US 2020/0256259 A1 Aug. 13, 2020

Related U.S. Application Data

(63) Continuation of application No. 15/672,014, filed on Aug. 8, 2017, now Pat. No. 10,662,879.

(51) Int. Cl.
*F16H 57/04* (2010.01)
*F02C 7/36* (2006.01)
(Continued)

(52) U.S. Cl.
CPC ................ *F02C 7/36* (2013.01); *F02C 7/06* (2013.01); *F16H 1/28* (2013.01); *F16H 57/0479* (2013.01); *F16H 57/0482* (2013.01); *F16H 57/082* (2013.01); *F05D 2220/323* (2013.01); *F05D 2260/40311* (2013.01); *F05D 2260/98* (2013.01)

(58) Field of Classification Search
CPC .... F16H 1/28; F16H 57/0479; F16H 57/0482; F16H 57/082; F02C 7/36; F02C 7/06
See application file for complete search history.

(56) References Cited

U.S. PATENT DOCUMENTS 3,257,869 A 6/1966 Sharples
3,527,121 A 9/1970 Moore
(Continued)

FOREIGN PATENT DOCUMENTS

DE 19706686 8/1998
EP 0229958 7/1987
(Continued)

*Primary Examiner* — Tisha D Lewis
(74) *Attorney, Agent, or Firm* — Norton Rose Fulbright Canada LLP

(57) ABSTRACT

A planetary gear train for an aircraft engine, has a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis, the planet carrier having planet bearings secured to the first and second disk members and extending axially therebetween, the planet gears rotatably supported by the planet bearings, the planet carrier having connecting members secured to both of the first and second disk members, the connecting members located circumferentially between the planet bearings, a lubrication network extending within the planet carrier and in fluid flow communication with the planet bearing and extending within the connecting members, the connecting members defining outlets of the lubrication network, the outlets oriented toward the sun gear.

17 Claims, 8 Drawing Sheets

(51) Int. Cl.
 *F02C 7/06* (2006.01)
 *F16H 57/08* (2006.01)
 *F16H 1/28* (2006.01)

(56) References Cited

U.S. PATENT DOCUMENTS

| | | | |
|---|---|---|---|
| 3,635,103 A | 1/1972 | Monti | |
| 3,654,815 A | 4/1972 | Dehne | |
| 3,842,481 A | 10/1974 | Laing | |
| 3,939,736 A | 2/1976 | Morin | |
| 3,943,780 A | 3/1976 | Klaue | |
| 4,129,050 A | 12/1978 | Akashi et al. | |
| 4,271,928 A | 6/1981 | Nothern | |
| 4,282,776 A | 8/1981 | Eller | |
| 4,329,130 A | 5/1982 | Nagata et al. | |
| 4,586,401 A | 5/1986 | Nogle | |
| 4,793,214 A | 12/1988 | Nurnberger et al. | |
| 4,854,184 A | 8/1989 | Jessup | |
| 4,856,377 A | 8/1989 | Goudreau et al. | |
| 4,983,152 A | 1/1991 | Kimberlin et al. | |
| 5,136,197 A | 8/1992 | Hallett | |
| 5,152,726 A | 10/1992 | Putney et al. | |
| 5,237,885 A | 8/1993 | Putney et al. | |
| 5,309,714 A | 5/1994 | Bellman et al. | |
| 5,382,203 A | 1/1995 | McKibbin et al. | |
| 5,466,198 A | 11/1995 | Fan | |
| 5,470,286 A | 11/1995 | Lederman | |
| 5,472,383 A * | 12/1995 | McKibbin | F16H 57/0482 |
| | | | 184/6.12 |
| 5,649,254 A | 7/1997 | Mori et al. | |
| 5,679,089 A | 10/1997 | Levedahl | |
| 5,928,105 A | 7/1999 | Taha et al. | |
| 6,148,605 A | 11/2000 | Lardellier | |
| 6,394,387 B1 | 5/2002 | Mitrovic | |
| 6,422,971 B1 | 7/2002 | Katou et al. | |
| 6,663,530 B2 | 12/2003 | Poulin et al. | |
| 6,837,819 B2 | 1/2005 | Foster | |
| 6,964,155 B2 | 11/2005 | McCune et al. | |
| 7,104,918 B2 | 9/2006 | Mitrovic | |
| 7,223,197 B2 | 5/2007 | Poulin et al. | |
| 8,491,436 B2 | 7/2013 | Duong et al. | |
| 8,647,229 B2 | 2/2014 | Ai et al. | |
| 8,827,863 B2 | 9/2014 | Poon et al. | |
| 8,840,508 B2 | 9/2014 | Floren et al. | |
| 9,079,317 B2 | 8/2015 | Ai et al. | |
| 9,523,424 B2 | 12/2016 | Altamura | |
| 9,702,451 B2 | 7/2017 | Gravina | |
| 9,803,742 B1 | 10/2017 | Raju et al. | |
| 2003/0008748 A1 | 1/2003 | Fox | |
| 2005/0070396 A1 | 3/2005 | Christ | |
| 2012/0028756 A1 | 2/2012 | Lopez et al. | |
| 2013/0035194 A1 | 2/2013 | Al et al. | |
| 2013/0102432 A1 * | 4/2013 | Imai | F16H 57/0409 |
| | | | 475/159 |
| 2015/0065285 A1 | 3/2015 | McCune et al. | |
| 2015/0361962 A1 * | 12/2015 | Hager | F16C 37/002 |
| | | | 475/159 |
| 2016/0084104 A1 * | 3/2016 | Sheridan | F01D 15/12 |
| | | | 416/170 R |
| 2016/0097330 A1 | 4/2016 | Venter | |
| 2016/0208905 A1 * | 7/2016 | Obayashi | F16H 57/0486 |
| 2016/0363211 A1 * | 12/2016 | Bradley | F16H 57/0479 |
| 2016/0377165 A1 * | 12/2016 | Sheridan | F16H 57/082 |
| | | | 60/226.1 |
| 2018/0010525 A1 * | 1/2018 | Madge | F02C 7/32 |

FOREIGN PATENT DOCUMENTS

| | | |
|---|---|---|
| EP | 0271416 | 6/1988 |
| EP | 0618383 | 10/1994 |
| EP | 0989316 | 3/2000 |
| EP | 1028275 | 8/2000 |
| EP | 1267095 | 12/2002 |
| EP | 2799674 | 5/2014 |
| GB | 725364 | 3/1955 |
| GB | 1420965 | 1/1976 |
| JP | 358061982 | 4/1983 |
| JP | 358156773 | 9/1983 |
| JP | 407332475 | 12/1995 |
| JP | 408270739 | 10/1996 |

* cited by examiner

EPICYCLIC GEAR STAGE

CROSS-REFERENCE TO RELATED APPLICATIONS

This application is a continuation of U.S. application Ser. No. 15/672,014 filed Aug. 8, 2017, the entire contents of which are incorporated by reference herein.

TECHNICAL FIELD

The present invention relates to epicyclic gearing, and more particularly, to a planetary carrier therefore.

BACKGROUND OF THE ART

Many models of gas turbine engines use one or two reduction stages of epicyclic gearing. An epicyclic reduction stage typically comprises a sun gear which receives an input torque, two or more planet gears which are intermeshed with, and revolve around the sun gear, receiving torque therefrom, and a carrier. The carrier generally has two functions: firstly, it carries the planet gears as they revolve collectively around the sun gear, and secondly it transfers the torque received from the revolving movement to an output shaft. The planet gears are free to rotate around their axes within the carrier, but the circular movement of their axes around the sun gear drives the rotary movement of the carrier. The planet gears are typically further intermeshed and contained within a ring gear which is fixed relative to the gas turbine engine. A single reduction stage, or a first reduction stage of a double reduction stage gearbox, may receive the input torque directly from a low pressure shaft, whereas a second reduction stage receives the input torque from the first reduction stage.

One challenge in epicyclic gearing of gas turbine engines is to keep the axes of the planet gears, or more specifically of the bearings thereof, parallel to the axis of the sun gear. Indeed, the planet gears are typically received on the carrier via cylindrical bearings which may wear quickly when operated with the axes of the planet gears inclined off parallel relative to the axis of the sun gear. Spherical bearings allow for such inclination, but they are typically heavier and bulkier than cylindrical bearings, which is especially undesirable in aircraft equipment. When large torque levels are present, axial torsion can occur in the carrier which can cause displacement of one axial end of each bearing relative to the bearing's opposite axial end, and thus undesirable inclination of the bearing axis relative to the sun gear axis. Such axial torsion can be present, for instance, when the torque is transferred primarily from one axial end of the planet gear bearings.

In the context of gas turbine engines, this challenge must be faced while taking a number of other factors into consideration, such as the control of the weight of the assembly, structural integrity, durability, manufacturability and manufacturing costs. Moreover, epicyclic gearing typically requires a supply of oil a) to the interface between the sun gear and the planet gears and b) to the bearings of the planet gears. While oil supply channels can be provided within some gas turbine engine components to convey oil from an oil source to an oil outlet, this approach is tributary to the presence of an oil source and the impact of the presence of oil supply channels on structural integrity must be taken into consideration. The conveying of lubrication oil is further complicated by the fact that in gas turbine engines, some components may be designed to move, within a certain extent, relative to others to account for load distribution, and that flexible joints are often used to connect a shaft to an epicyclic gear stage, or epicyclic gear stages to one another, to accommodate such relative movement. Flexible joints typically cannot be provided with integrated oil supply channels, forcing designers to find another path for the conveyance of lubrication oil.

While these challenges had been addressed to a certain extent, in certain circumstances, there remained room for improvement.

SUMMARY

In one aspect, there is provided a planetary gear train for an aircraft engine, comprising a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis, the planet carrier having planet bearings secured to the first and second disk members and extending axially therebetween, the planet gears rotatably supported by the planet bearings, the planet carrier having connecting members secured to both of the first and second disk members, the connecting members located circumferentially between the planet bearings, a lubrication network extending within the planet carrier and in fluid flow communication with the planet bearing and extending within the connecting members, the connecting members defining outlets of the lubrication network, the outlets oriented toward the sun gear.

In another aspect, there is provided an aircraft engine, comprising: a low-pressure shaft drivingly engaged to a turbine section and an output shaft drivingly engageable to a rotatable load, a planetary gear train having a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis and secured to one another via connecting members circumferentially distributed around the rotation axis, the planet carrier having planet bearings interspaced with the connecting members and secured to the first and second disk members, the planet gears rotatably supported by the planet bearings, the low-pressure shaft drivingly engaged to one of the sun gear, the ring gear, and the planet carrier, the output shaft drivingly engaged to another one of the sun gear, the ring gear, and the planet carrier, rotation of a remaining one of the sun gear, the ring gear, and the planet carrier being limited, a lubrication network extending within the planet carrier, the lubrication network in fluid flow communication with the planet bearings, the lubrication network having an inlet hydraulically connected to an oil source and outlets in the connecting members, the outlets oriented in a direction having a radially inward component relative to the central axis.

In yet another aspect, there is provided a method of lubricating a planetary gear train having planet gears rotatably mounted on planet bearings and meshed with both a sun gear and a ring gear, comprising: supporting the planet bearings by first and second disk members connected to one another by connecting members; injecting oil through a lubrication network of the planetary gear train; circumferentially distributing the oil around a rotation axis of the sun gear; and injecting the oil from outlets defined in the connecting members toward the sun gear.

DESCRIPTION OF THE DRAWINGS

Reference is now made to the accompanying figures in which.

DETAILED DESCRIPTION

Figure 1:
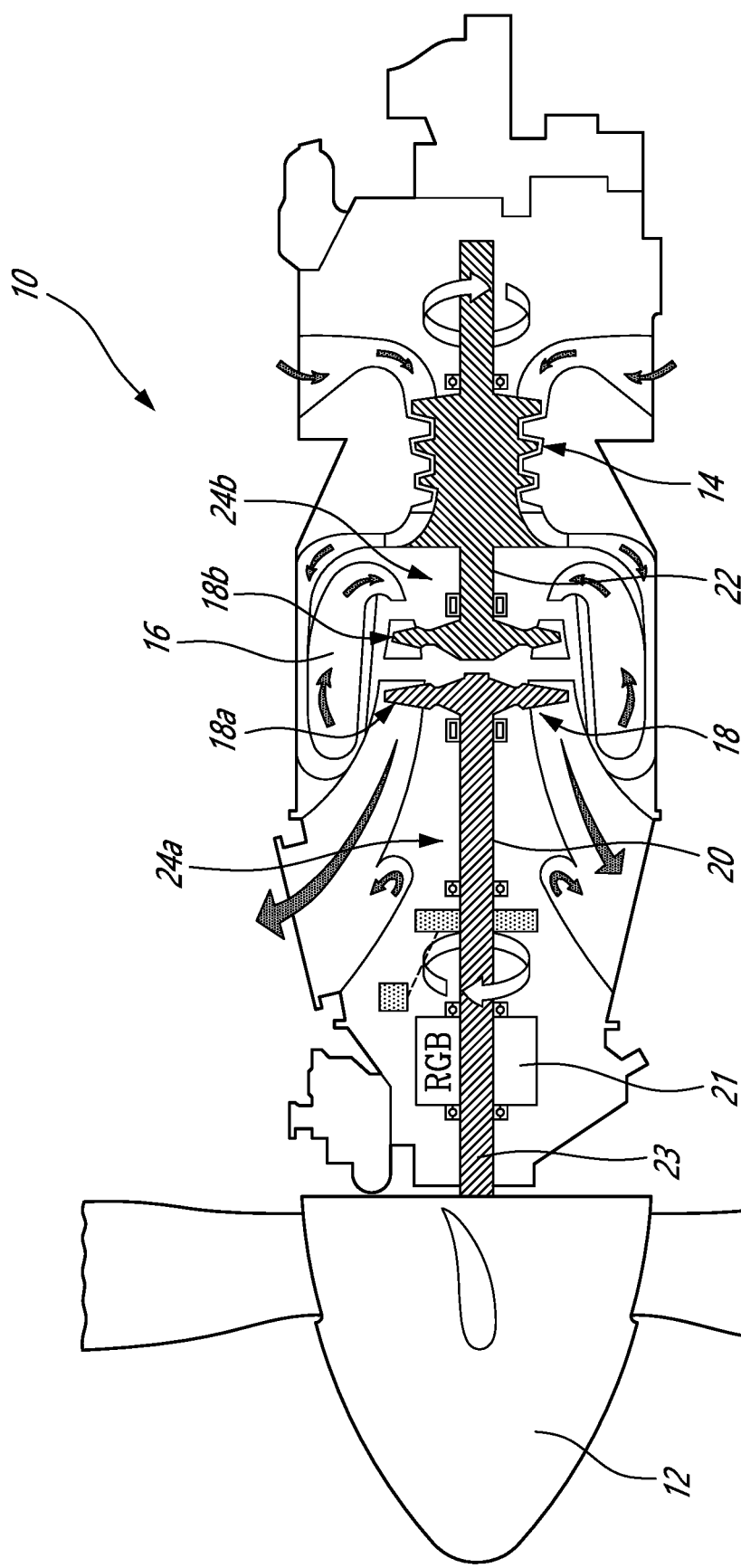
FIG. 1 is a schematic cross-sectional view of a gas turbine engine.

FIG. 1 illustrates a first embodiment of gas turbine engine 10 of a type preferably provided for use in subsonic flight, generally comprising in serial flow communication a propeller 12 through which ambient air is propelled, an intake, a compressor section 14 for pressurizing the air, a combustor 16 in which the compressed air is mixed with fuel and ignited for generating an annular stream of hot combustion gases, and a turbine section 18 for extracting energy from the combustion gases.

The turbine section 18 includes a low pressure turbine having one or more rotor(s) 18a connected to the propeller 12, and a high pressure turbine having one or more rotor(s) 18b connected to the compressor section 14. Each of the turbines may thus include one or more turbine stages. Accordingly, although a single turbine rotor is mentioned in the following description, it is understood that additional rotors may be included in each turbine and mounted on each shaft, and that such embodiments are also within the scope of this disclosure.

The low pressure turbine rotor 18a is mounted at one end of a low pressure shaft 20 (an engine shaft), so that a rotation of the low pressure turbine rotor 18a rotates the low pressure shaft 20. Another end of the low pressure shaft 20 is connected to a reduction gearbox (RGB) 21. The RGB 21 transmits a speed of rotation to a propeller shaft 23 that is reduced relative to a speed of rotation of the low pressure shaft 20. The propeller shaft 23 is shown in this embodiment to be in-line with the low pressure shaft 20, but it is contemplated that the gas turbine engine 10 could have the propeller shaft 23 offset from the low pressure shaft 20. This is the case, for example, in gas turbine engines with offset gearboxes.

The low pressure turbine rotor 18a and the low pressure shaft 20 are part of a low pressure spool 24a. The high pressure turbine rotor 18b is connected to the rotor(s) of the compressor section 14 via a high pressure shaft 22. The high pressure turbine rotor 18b, the rotor(s) of the compressor section 14, and the high pressure shaft 22 are part of a high pressure spool 24b. The low pressure spool 24a and the high pressure spool 24b rotate independently from one another.

Figure 2:
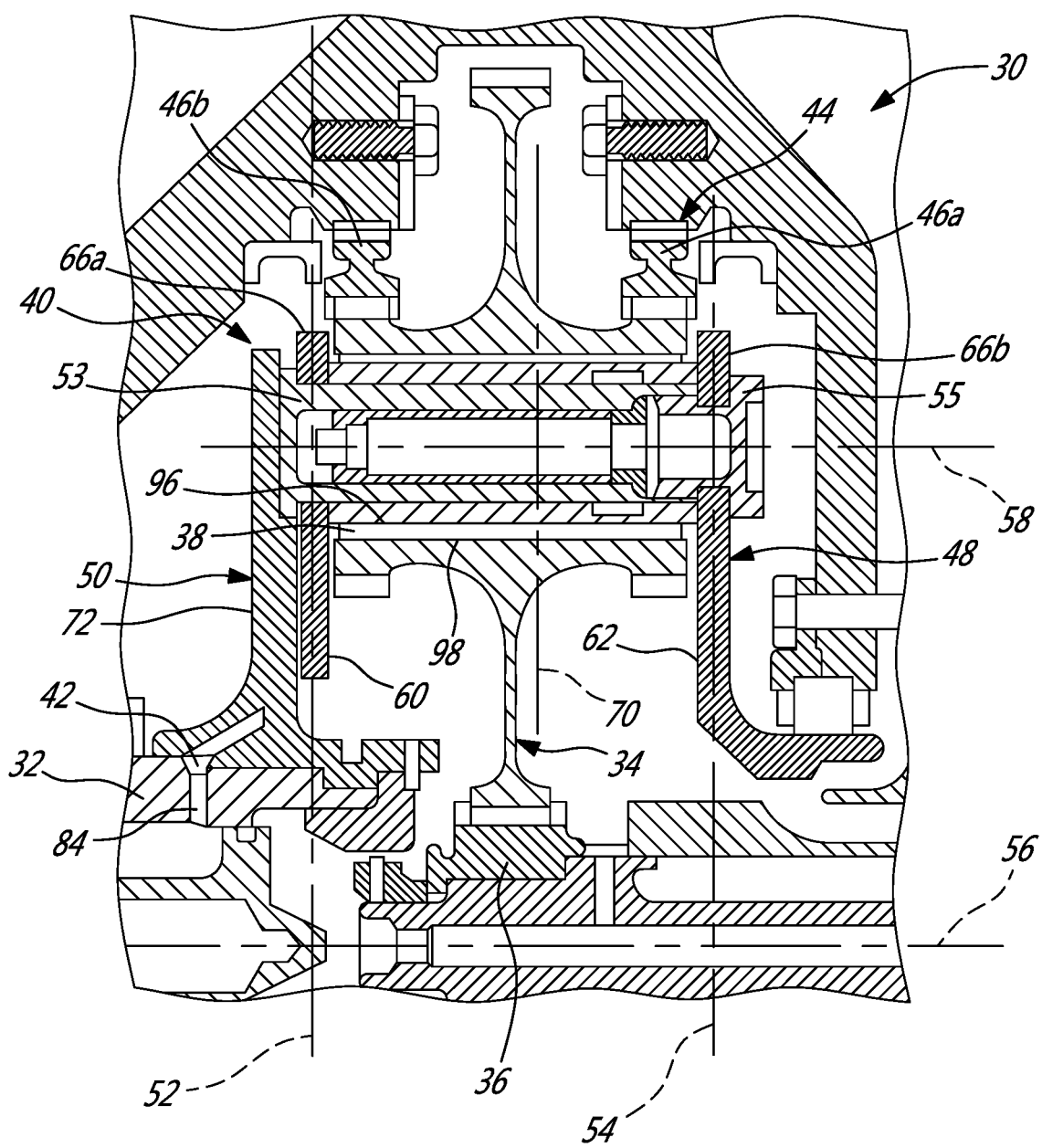
FIG. 2 is a cross-sectional view of a portion of an epicyclic gear stage, in accordance with an embodiment.

A first embodiment of an epicyclic gear stage 30 is illustrated in greater detail in FIG. 2. In this embodiment, the epicyclic gear stage 30 is a single epicyclic reduction stage of a gas turbine engine 10, receives input torque from a low pressure shaft 20 via the right hand side at a first rotation speed, and outputs torque to an output shaft 32 on the left hand side at a second rotation speed reduced relative to the first rotation speed by the epicyclic gear stage 30.

Figure 3:
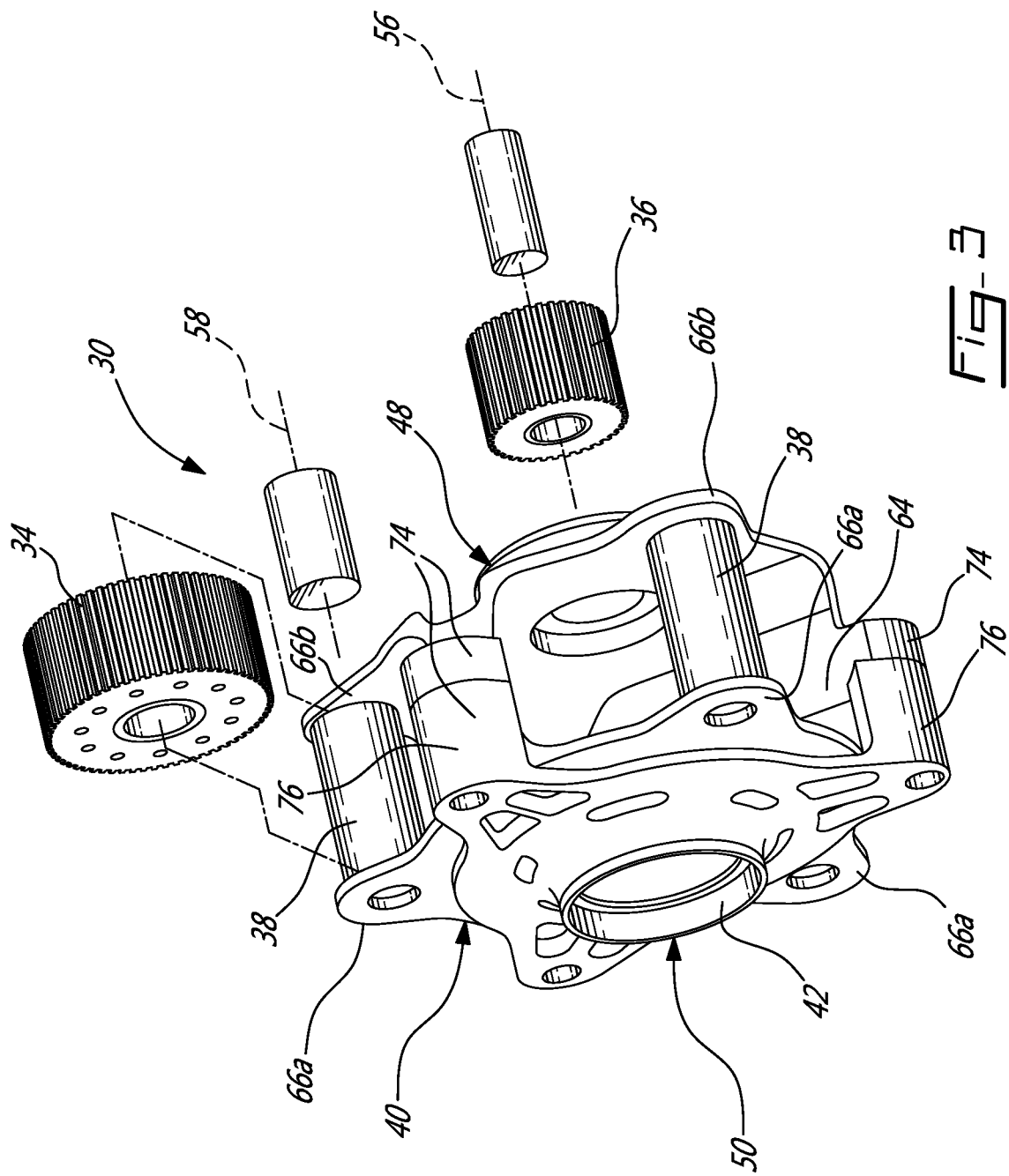
FIG. 3 is a schematic perspective view of a carrier of an epicyclic gear stage, in accordance with an embodiment.

Referring to FIG. 2, and also to FIG. 3 where a planet gear 34 and a sun gear 36 are schematically depicted, the epicyclic gear stage 30 can be seen to generally include a sun gear 36 connected to be driven into rotation by the low pressure shaft 20, a plurality of planet gears 34 (one of which is shown sectioned in FIG. 2) which are circumferentially interspaced from one another around the sun gear 36 and intermeshed therewith in a manner to be driven into rotation by the sun gear 36. A carrier 40 is provided which both i) rotatably receives the planet gears 34 via corresponding planet gear bearings 38 and receives the torque from the revolving motion of the planet gears 34 around the sun gear 36 and ii) transfers the torque to the output shaft 32. In this embodiment, the carrier 40 is made integral to the output shaft 32 via a shaft coupler 42, and the epicyclic gear stage further includes a ring gear 44, provided here in the form of two fixed, parallel ring gear segments 46a, 46b which are further intermeshed with the planet gears.

In this specification, the expression carrier portion will be used to refer to the portion of the carrier 40 which is primarily responsible to perform function i), and the expression torque transfer portion will be used to refer to the portion of the carrier 40 which is primarily responsible to perform function ii). In the illustrated embodiment, taking into consideration manufacturability, it was preferred to provide the torque transfer portion and the carrier portion as separate components which are secured to one another and which can be referred to as the carrier body 48 and the torque transfer body 50.

For use as virtual references, two planes will be defined: a first bearing plane 52 where the plurality of first axial ends 53 of the planet bearings 38 are received by the carrier 40, and a second bearing plane 54 where the plurality of second axial ends 55 of the planet bearings 38 are received by the carrier 40. It will be understood that the presence of high torque in the carrier, between these two planes 52, 54, may rotate one bearing plane relative to the other around the sun gear (or output shaft) axis 56, and thus incline the bearing axes 58 off parallel relative to the sun gear axis 56, which is undesirable. In this embodiment, the eventuality of undesirable inclination is satisfactorily addressed given the structure of the carrier 40.

Figure 4:
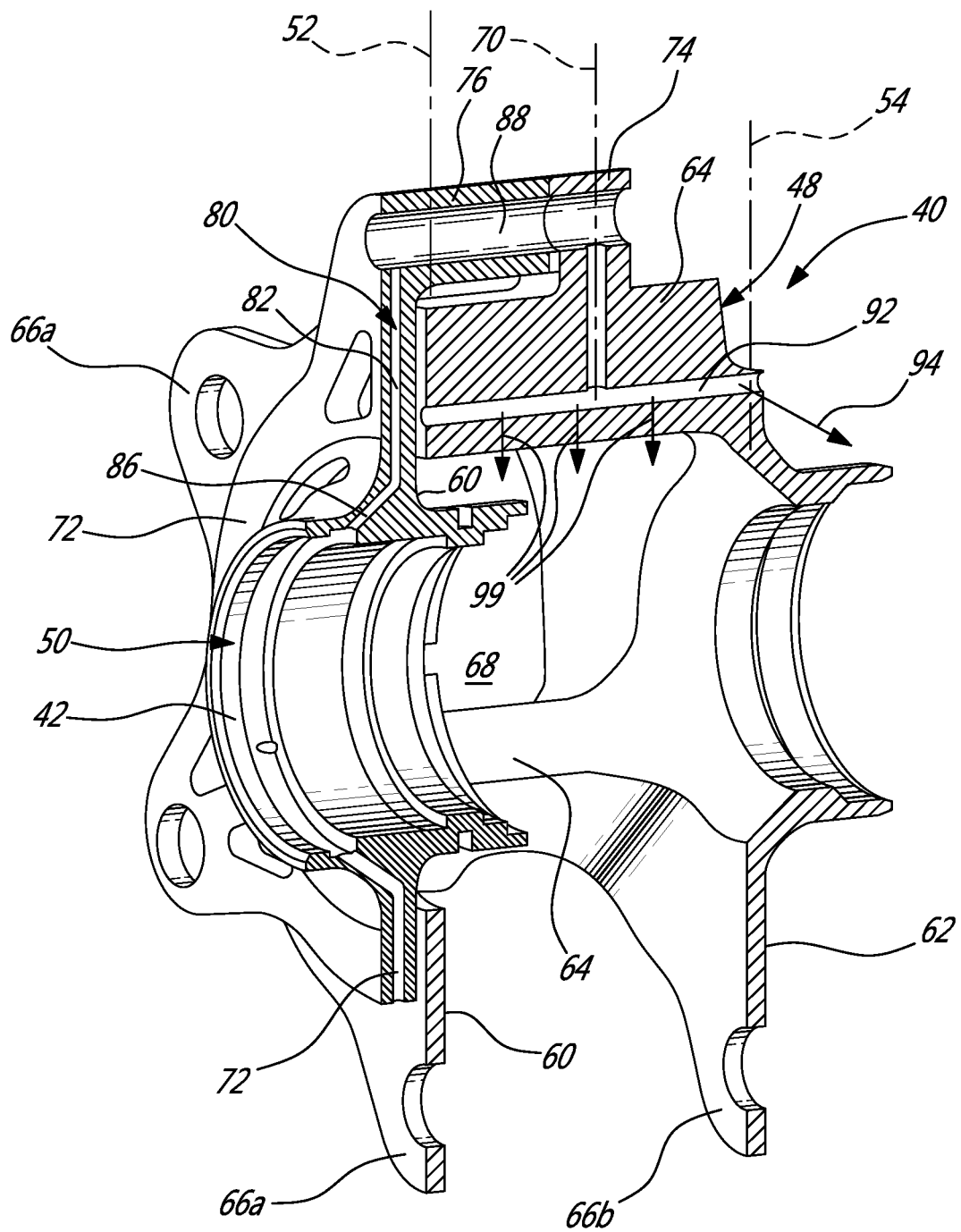
FIG. 4 is a sectioned perspective view of the carrier of FIG. 3.

More specifically, as can be seen in FIGS. 2 to 4, the carrier 40 has two annular structural members, which will be referred to herein as disc members 60, 62, interspaced from one another and connected to one another by a plurality of circumferentially interspaced connecting members 64. The disc members 60, 62 are each provided with a corresponding set of bearing couplers 66a, 66b which receive a corresponding axial end 53, 55 of the planet bearings 38. The disc members 60, 62 provide a certain amount of structure and collaborate, via the connecting members 64, in receiving the torque from the revolving motion of the planet gears 34 around the sun gear 36. The connecting members 64 generally extend axially between the discs 60, 62, and are circumferentially interspersed with the planet gears 34. There is thus an equal number of planet gears 34 and of connecting members 64 in this embodiment and the planet gears 34 are circumferentially offset with the connecting members 64 by half the circumferential distance between two adjacent planet gears 34. A central cavity 68 is provided in the carrier 40 to house the sun gear.

Connecting a corresponding one of these discs 60, 62 directly to the power output shaft 32 could result, at a given level of torque, in torsion between the discs 60, 62 and in an undesired level of bearing axis inclination during operation. Such a torque load distribution will be referred to herein as "unbalanced" in the context where more torque would be applied to the first disc member than to the second disc member, causing the torsion (relative circumferential displacement) between the disc members 60, 62.

In this embodiment, the carrier 40 is designed to balance the loads between the torque transfer body 50 and the bearing couplers 66a, 66b, to limit or impede the amount of torsion between the two disc members 60, 62 and the corresponding inclination of the bearing axes 58. This is achieved by providing a torque transfer interface along the connecting members 64, the torque transfer interface being more specifically located at a balanced torque transfer plane 70 located between the first bearing plane 52 and the second bearing plane 54. More specifically, a third annular structural member which will be referred to herein as a third disc member 72 is provided adjacent to, but separate from, the second disc member 60. The connecting members 64 have radial protrusions 74 which play the role of the torque transfer interface in this embodiment, and which are made integral to the third disc member 72 via a corresponding plurality of connecting arms 76 which extend radially-outwardly from the sun gear area. In this embodiment, the connecting arms 76 extend generally axially, radially-outwardly from the connecting members 64, but the design details can vary in alternate embodiments. In the design presented in the figures, axial torsion deformation occurs preferentially within the connecting arms 76, and therefore between the third disc member 72 and the carrier body 48 (having the other two disc members 60, 62), which has limited, if any, effect on bearing axis orientation. In this embodiment, the axial position of the radial protrusions 74 along the connecting members 64 coincides with the position of the balanced torque transfer plane 70, and the radial protrusions 74 can be said to form part of the torque transfer portion of the carrier 40, even though it was not technically decided to make them part of the torque transfer body 50, but rather part of the carrier body 48, in this specific design. An optimized location of the torque transfer plane 70 for a specific design can be determined using computer-assisted analysis as will be understood by persons having ordinary skill in the art. The optimized location of the torque transfer plane 70 can also take into consideration torsion imparted around a radial axis coinciding with the radial protrusions 74, for instance, and the torque transfer plane 70 can be offset from the exact middle between the two bearing planes 52, 54 to compensate for the effects that such radial torsion can have on planet bearing/sun gear parallelism, for instance.

In an embodiment where the torque transfer body 50 is a separate component from the carrier body 48, the radial protrusions 74 can be provided as part of the carrier body 48, the connecting arms 76 can be made integral to the third disc member 72, and the connecting arms 76 can be fastened to the radial protrusions 74, examples of which will be presented below. The third disc member 72 can be provided with a shaft coupler 42 to securely receive an output shaft 32, for instance. The third disc member 72 can be alternately referred to herein as a torque transfer disc member, and the first and second disc members 60, 62 can alternately be referred to herein as carrier disc members.

In the embodiment presented in FIGS. 2 to 4, a lubricant network 80 is provided in the carrier 40 to lubricate both i) the interface between the sun gear 36 and the planet gears 34 and ii) the planet bearings 38. In this embodiment, referring to FIG. 2, the sun gear 36 may be segmented from the low pressure shaft on the right hand side by a flexible joint (not shown), or an oil source may be absent on the right hand side, preventing the lubricant network from leading into the epicyclic gear stage 30 via the first disc member 62. The lubricant network rather leads into the epicyclic gear stage via the third disc member 72. The lubricant network includes a plurality of circumferentially interspaced oil paths 82, with each of said oil paths 82 being associated to a corresponding connecting arm 76, connecting member 64, and planet bearing 38. The oil paths 82 can have a single, collective inlet, or independent inlets. The inlet(s) can be provided centrally to the third disc member 72, to receive oil from a corresponding oil source. The oil source can be provided in the form of oil channels 84 in the output shaft 32 for instance. As shown more clearly in FIG. 4, in the illustrated embodiment, each oil path 82 includes a first segment 86 extending from the radially outwardly from the inlet to the corresponding connecting arm 76, a second segment 88 extending axially along the connecting arm 76 and into the corresponding radial protrusion 74, a third segment 90 extending radially-inwardly from the radial protrusion 74 into the corresponding connecting member 64, a fourth segment 92 extending axially along the connecting member 64 to the first disc member 62, and a fifth segment 94 extending transversally, or circumferentially, within the first disc member 62 and leading to the corresponding planet bearing 38. The fifth segment 94 is shown more clearly in FIG. 5.

As best shown in FIG. 2, in this embodiment, the planet bearings 38 are plain journal bearings having an external cylindrical 96 surface closely matching the dimension of a corresponding internal cylindrical surface 98 provided in the planet gear 34 (e.g. with a spacing in the order of 0.004" therebetween). Plain journal bearings were preferred in this embodiment due to their simplicity, low weight, and low encumbrance. In alternate embodiments, other types of cylindrical bearings can be used such as needle bearings or roller bearings, for instance.

As best shown in FIG. 4, in this embodiment, the fourth segment 92 extends axially on both sides of its inlet and has a plurality of sun gear lubrication outlets 99 directed radially-inwardly towards the sun gear. The exact design of the lubricant network 80 can vary in alternate embodiments. For instance, the lubricant network 80 can be provided to lubricate only the planet bearings 38, and the interface between the sun gear 36 and the planet gears 34 can be lubricated by alternate means.

As will be understood from the description presented above, the details of the design, taking into consideration the presence of the lubricant network, must further take into account structural integrity, weight, and manufacturability. In this embodiment, it was not found satisfactory to provide the carrier 40 in the form of a single component. Rather, the carrier 40 was assembled from a carrier body 48 and a torque transfer body 50, both of which had been manufactured independently from one another with the corresponding lubricant channel segments. The torque transfer body 50 and the carrier body 48 are assembled to one another near the balanced torque transfer plane 70, and more specifically, ends of the connecting arms 76 engage a corresponding axial faces of the radial protrusions 74. Fasteners 81 can be used to secure the connecting arms 76 to the radial protrusions 74.

Figure 6:
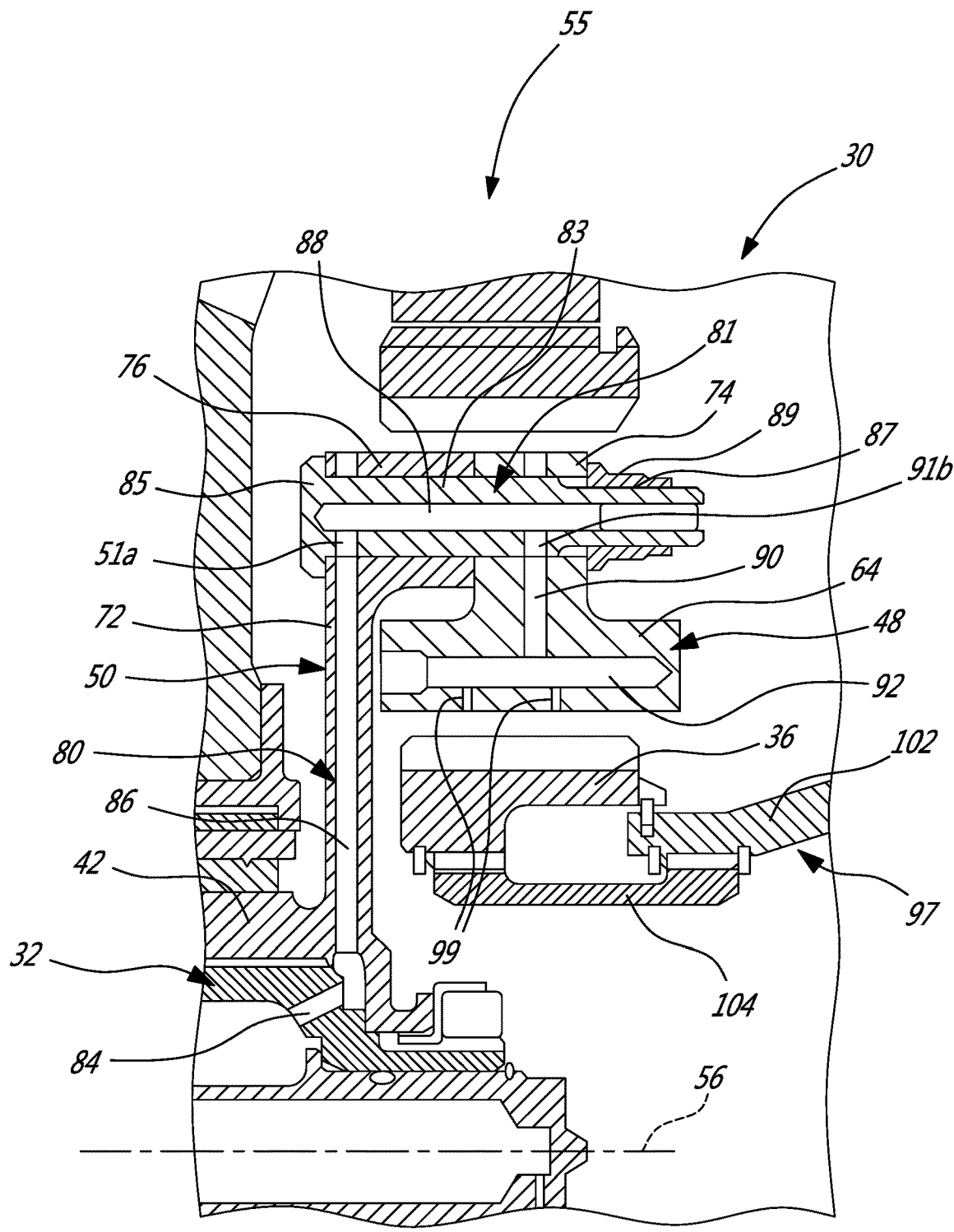
FIG. 6 is a cross-sectional view of a portion of an epicyclic gear stage, in accordance with another embodiment.

More specifically, in an embodiment shown in FIG. 6, it was preferred to provide the second segment 88 of the oil paths 82 within the core of the fastener 81 to provide sufficient structural integrity and satisfactorily low weight of the connecting arms 76 and radial protrusions 74. In the embodiment shown in FIG. 6, the fastener 81 has a shaft 83 with a head 85 abutting a face of the third disc member 72, a threaded stem 87 protruding from the second face of the radial protrusion 74, opposite the connecting arm 76, and secured thereagainst via a nut member 89, the shaft 83 having a hollow center and two radial apertures 91a, 91b leading into the hollow center, at opposite ends thereof. In use, the shaft 83 is aligned for the radial apertures 91a, 91b to communicate with corresponding apertures in the third disc member 72 and in the radial protrusions 74 and to bring the corresponding channel segments 86, 88, 90 into permanent communication.

In the embodiment shown in FIGS. 2 to 5, the epicyclic gear stage 30 can form part of a single reduction stage gearbox, for instance.

Figure 7:
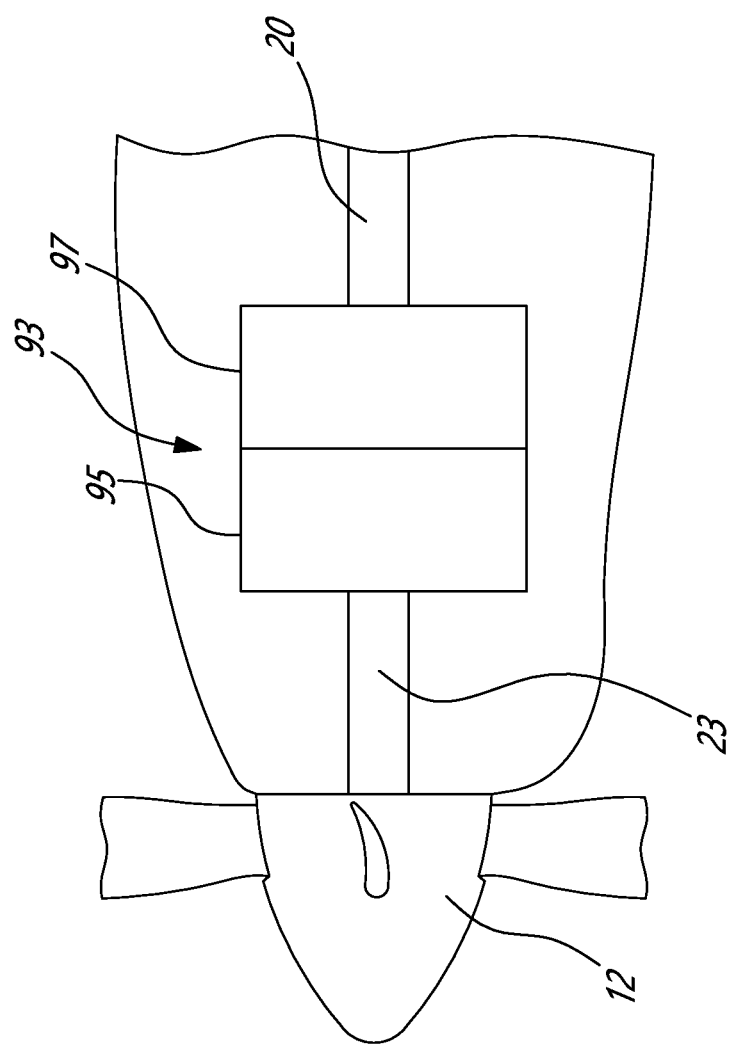
FIG. 7 is a schematic cross-sectional view of a gas turbine engine having two epicyclic reduction gear stages in series.

It will be understood that in the embodiment shown in FIG. 6, the epicyclic gear stage 30 is the second reduction gear stage 95 of a double reduction stage gearbox 93 further comprising a first reduction gear stage 97, such as shown in FIG. 7. More specifically, as shown in FIG. 6, the sun gear 36 is driven into rotation by a torque transfer portion 102 of the first reduction gear stage 97, and is more specifically connected thereto via a flexible joint 104 which allows for relative displacement, within a certain extent, between the first reduction gear stage 95 and the second reduction gear stage 97 during operation.

Figure 5:
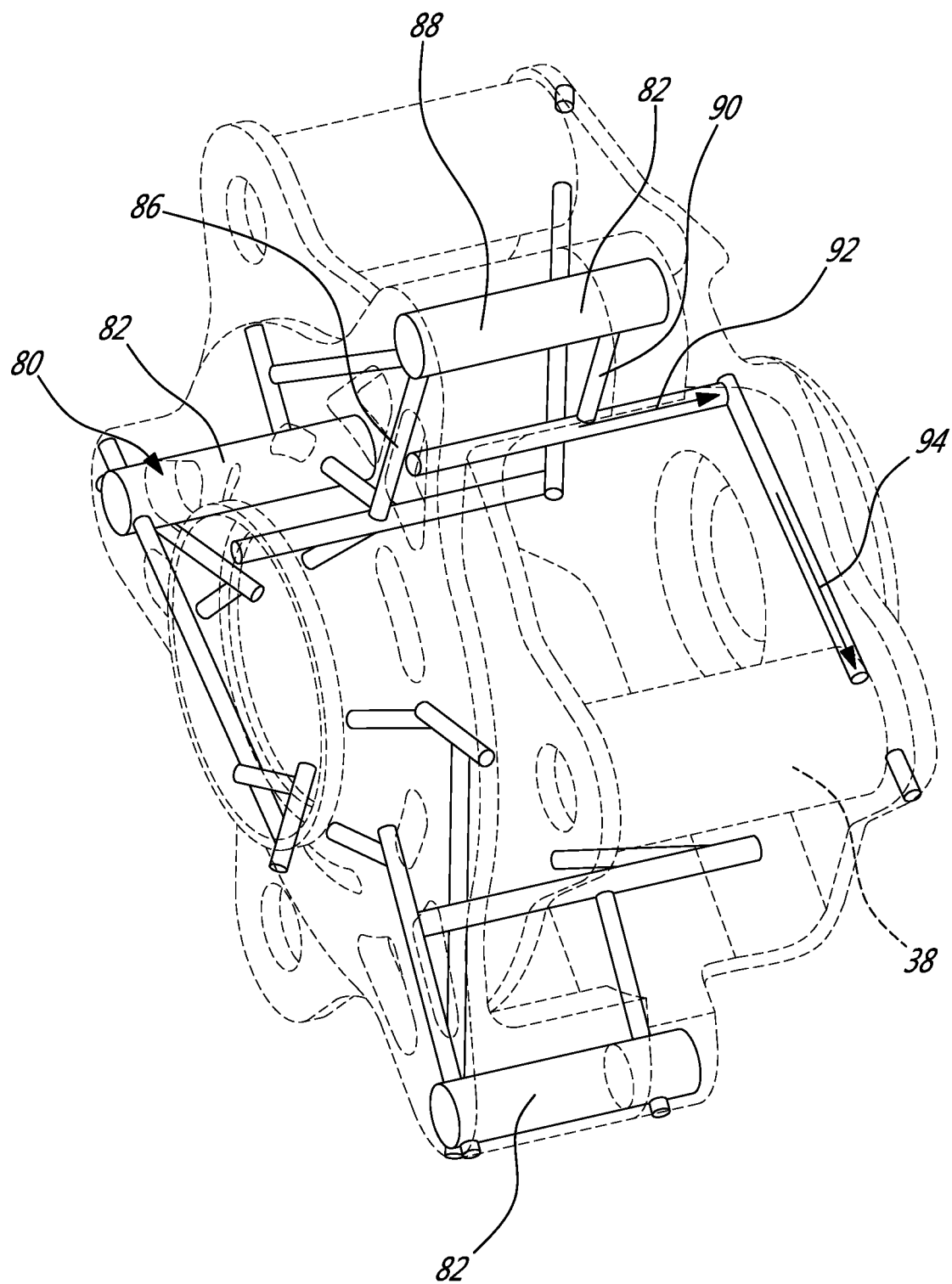
FIG. 5 is a perspective view showing the lubricant network of the carrier of FIG. 3.
Figure 8:
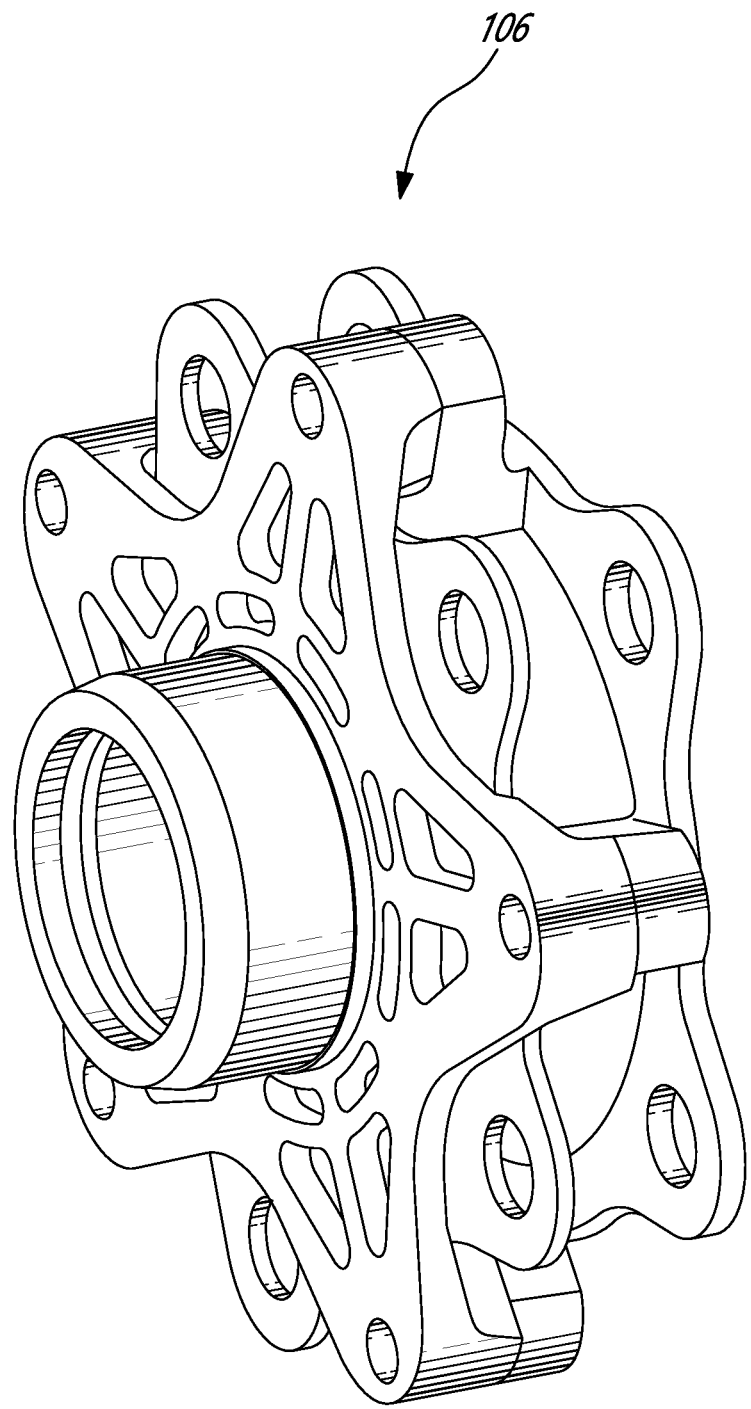
FIG. 8 is a perspective view of an alternate embodiment of a carrier.

Referring now to FIG. 8, it will be understood that although the example epicyclic gear stage embodiment illustrated in FIGS. 3-5 has three planet gears 34, alternate embodiments can have a different number of planet gears. For instance, in FIG. 8, a carrier 106 adapted to an epicyclic gear stage having five planet gears is shown.

Referring more particularly to FIG. 4, for lubricating the planetary gear train 30, oil is injected through a lubrication network 80 of the planetary gear train 30; the oil is circumferentially distributed around the rotation axis 56 of the sun gear 36; and the oil is injected from outlets 99 defined in the connecting members 64 toward the sun gear 36; the planet bearings are supported by first and second disc members 60, 62 connected to one another by the connecting members 64.

Embodiments disclosed herein include:

A. A planetary gear train for an aircraft engine, comprising a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis, the planet carrier having planet bearings secured to the first and second disk members and extending axially therebetween, the planet gears rotatably supported by the planet bearings, the planet carrier having connecting members secured to both of the first and second disk members, the connecting members located circumferentially between the planet bearings, a lubrication network extending within the planet carrier and in fluid flow communication with the planet bearing and extending within the connecting members, the connecting members defining outlets of the lubrication network, the outlets oriented toward the sun gear.

B. An aircraft engine, comprising: a low-pressure shaft drivingly engaged to a turbine section and an output shaft drivingly engageable to a rotatable load, a planetary gear train having a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis and secured to one another via connecting members circumferentially distributed around the rotation axis, the planet carrier having planet bearings interspaced with the connecting members and secured to the first and second disk members, the planet gears rotatably supported by the planet bearings, the low-pressure shaft drivingly engaged to one of the sun gear, the ring gear, and the planet carrier, the output shaft drivingly engaged to another one of the sun gear, the ring gear, and the planet carrier, rotation of a remaining one of the sun gear, the ring gear, and the planet carrier being limited, a lubrication network extending within the planet carrier, the lubrication network in fluid flow communication with the planet bearings, the lubrication network having an inlet hydraulically connected to an oil source and outlets in the connecting members, the outlets oriented in a direction having a radially inward component relative to the central axis.

Embodiments A and B may include any of the following elements, in any combinations:

Element 1: each of the connecting members defines at least two outlets axially offset from one another. Element 2: a number of the connecting members corresponds to a number of the planet gears. Element 3: the lubrication network includes conduits, each of the conduits extending axially within a respective one of the connecting members, the outlets in fluid flow communication with the conduits. Element 4: the lubrication network has an inlet defined by the planet carrier, the inlet facing a radially inward direction relative to the rotation axis. Element 5: the inlet includes apertures circumferentially distributed about the rotation axis. Element 6: the lubrication network defines a plurality of oil paths circumferentially distributed about the rotation axis, each of the oil paths connected to a respective one of the apertures. Element 7: each of the oil paths includes a first segment extending radially outwardly relative to the rotation axis from a respective one of the apertures, a second segment connected to the first segment and extending axially relative to the rotation axis, a third segment connected to the second segment and extending radially inwardly relative to the rotation axis, and a fourth segment connected to the second segment and extending axially relative to the rotation axis, the outlets connected to the apertures via the fourth segments. Element 8: each of the oil paths further includes fifth segment extending in a direction having a circumferential component and fluidly connected to a respective one of the planet bearings. Element 9: the fifth segment stems from the fourth segment. Element 10: each of the connecting members defines at least two outlets axially offset from one another. Element 11: a number of the connecting members corresponds to a number of the planet gears. Element 12: comprising a third disk member adjacent the first disk member, an inlet of the lubrication network defined by the third disk member. Element 13: the inlet of the lubrication network includes apertures defined through the third disk member and circumferentially distributed about the central axis, the apertures oriented toward the rotation axis. Element 14: each of the connecting members define a conduit fluidly connected to a respective one of the apertures. Element 15: the lubrication network include a plurality of oil paths each having an oil path inlet corresponding to a respective one of the apertures. Element 16: each of the oil paths has a first segment extending radially outwardly from the aperture and within the third disk member, a second segment connected to the first segment and extending axially relative to the rotation axis, a third segment connected to the second segment and extending radially inwardly, and a fourth segment connected to the third segment and extending axially within the connecting members, the outlets connected to the oil source via the first, second, third, and fourth segments. Element 17: the third disk member includes connecting arms extending axially relative to the rotation axis and secured to radial protrusions of the connecting members, the radial protrusions extending radially outwardly from a body of the planet carrier, the second segment extending within the connecting arms and within the radial protrusions.

The above description is meant to be exemplary only, and one skilled in the art will recognize that changes may be made to the embodiments described without departing from the scope of the invention disclosed. For example, the torque transfer portion and the carrier portion of the carrier can alternately be provided in the form of a single, monolithic component if found suitable in alternate embodiments. Embodiments detailed above and in the associated figures illustrate an epicyclic gear stage used as a reduction stage between a low pressure shaft and a propeller shaft. It will be understood that in alternate embodiments, the epicyclic gear stage can be used as a reduction stage between a low pressure shaft and a power shaft of a turboshaft engine, or of a turbofan engine, for instance. Moreover, in still other embodiments, the epicyclic gear stage can be used in other contexts than a gas turbine engine, and can be used to receive power via the third disc member rather than output power via the third disc member. Still other modifications which fall within the scope of the present invention will be apparent to those skilled in the art, in light of a review of this disclosure, and such modifications are intended to fall within the appended claims.

The invention claimed is:

1. A planetary gear train for an aircraft engine, comprising a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis, the planet carrier having planet bearings secured to the first and second disk members and extending axially therebetween, the planet gears rotatably supported by the planet bearings, the planet carrier having connecting members secured to both of the first and second disk members, the connecting members located circumferentially between the planet bearings, a lubrication network extending within the planet carrier and in fluid flow communication with the planet bearing and extending within the connecting members, the connecting members defining outlets of the lubrication network, the outlets oriented toward the sun gear, the lubrication network having an inlet defined by the planet carrier, the inlet facing a radially inward direction relative to the rotation axis, the inlet including apertures circumferentially distributed about the rotation axis.

2. The planetary gear train of claim 1, wherein each of the connecting members defines at least two outlets axially offset from one another.

3. The planetary gear train of claim 1, wherein a number of the connecting members corresponds to a number of the planet gears.

4. The planetary gear train of claim 1, wherein the lubrication network includes conduits, each of the conduits extending axially within a respective one of the connecting members, the outlets in fluid flow communication with the conduits.

5. The planetary gear train of claim 1, wherein the lubrication network defines a plurality of oil paths circumferentially distributed about the rotation axis, each of the oil paths connected to a respective one of the apertures.

6. The planetary gear train of claim 5, wherein each of the oil paths includes a first segment extending radially outwardly relative to the rotation axis from a respective one of the apertures, a second segment connected to the first segment and extending axially relative to the rotation axis, a third segment connected to the second segment and extending radially inwardly relative to the rotation axis, and a fourth segment connected to the second segment and extending axially relative to the rotation axis, the outlets connected to the apertures via the fourth segments.

7. The planetary gear train of claim 6, wherein each of the oil paths further includes a fifth segment extending in a direction having a circumferential component and fluidly connected to a respective one of the planet bearings.

8. The planetary gear train of claim 7, wherein the fifth segment stems from the fourth segment.

9. An aircraft engine, comprising: a low-pressure shaft drivingly engaged to a turbine section and an output shaft drivingly engageable to a rotatable load, a planetary gear train having a sun gear rotatable about a rotation axis, planet gears meshed with the sun gear and circumferentially distributed about the rotation axis, and a ring gear meshed with the planet gears, a planet carrier having first, second, and third disk members axially offset from one another relative to the rotation axis and secured to one another via connecting members circumferentially distributed around the rotation axis, the planet carrier having planet bearings interspaced with the connecting members and secured to the first and second disk members, the planet gears rotatably supported by the planet bearings, the low-pressure shaft drivingly engaged to one of the sun gear, the ring gear, and the planet carrier, the output shaft drivingly engaged to another one of the sun gear, the ring gear, and the planet carrier, rotation of a remaining one of the sun gear, the ring gear, and the planet carrier being limited, a lubrication network extending within the planet carrier and having an inlet defined by the third disk member, the lubrication network in fluid flow communication with the planet bearings, the lubrication network having an inlet hydraulically connected to an oil source and outlets in the connecting members, the outlets oriented in a direction having a radially inward component relative to the central axis.

10. The aircraft engine of claim 9, wherein each of the connecting members defines at least two outlets axially offset from one another.

11. The aircraft engine of claim 9, wherein a number of the connecting members corresponds to a number of the planet gears.

12. The aircraft engine of claim 9, wherein the inlet of the lubrication network includes apertures defined through the third disk member and circumferentially distributed about the central axis, the apertures oriented toward the rotation axis.

13. The aircraft engine of claim 12, wherein each of the connecting members define a conduit fluidly connected to a respective one of the apertures.

14. The aircraft engine of claim 12, wherein the lubrication network include a plurality of oil paths each having an oil path inlet corresponding to a respective one of the apertures.

15. The aircraft engine of claim 14, wherein each of the oil paths has a first segment extending radially outwardly from the aperture and within the third disk member, a second segment connected to the first segment and extending axially relative to the rotation axis, a third segment connected to the second segment and extending radially inwardly, and a fourth segment connected to the third segment and extending axially within the connecting members, the outlets connected to the oil source via the first, second, third, and fourth segments.

16. The aircraft engine of claim 15, wherein the third disk member includes connecting arms extending axially relative to the rotation axis and secured to radial protrusions of the connecting members, the radial protrusions extending radially outwardly from a body of the planet carrier, the second segment extending within the connecting arms and within the radial protrusions.

17. A planetary gear train for an aircraft engine, comprising a sun gear rotatable about a rotation axis, planet gears meshed with the sun gear and circumferentially distributed about the rotation axis, and a ring gear meshed with the planet gears, a planet carrier having first and second disk members axially offset from one another relative to the rotation axis, the planet carrier having planet bearings secured to the first and second disk members and extending axially therebetween, the planet gears rotatably supported by the planet bearings, the planet carrier having connecting members secured to both of the first and second disk members, the connecting members located circumferentially between the planet bearings, a lubrication network extending within the planet carrier and in fluid flow communication with the planet bearing and extending within the connecting members, the connecting members defining outlets of the lubrication network, the outlets oriented toward the sun gear, at least one of the connecting members defining at least two outlets axially offset from one another.

\* \* \* \* \*